July 13, 1926.

B. C. STICKNEY

TYPEWRITING MACHINE

Filed March 14, 1923

1,592,392

Inventor:

Burnham C. Stickney

Patented July 13, 1926.

1,592,392

UNITED STATES PATENT OFFICE.

BURNHAM C. STICKNEY, OF RUTHERFORD, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed March 14, 1923. Serial No. 624,909.

The present invention relates to platens for typewriting machines, and to processes for making the same.

An object of the invention is the production of a platen, which, in use, may be relatively noiseless, and which, nevertheless, will assure clearness of type-impressions.

A feature of the invention is a facing or jacket, for the platen, of a material, and so constructed, that the same, while substantially non-resonant to the impact of the type, is nevertheless of the hardness and impressibility requisite for clear type-impressions. In the preferred embodiment of the invention, the facing or jacket is built up of rings or annuli of compressed rawhide, set and secured together in a manner hereinafter described.

A further feature of the invention is a heavy tubular core of material such as lead, in itself but slightly resonant, for muffling sound, and over which the completed jacket may be slipped.

Other features of the invention, in the preferred form thereof, are; a tube of steel or other metal serving with the heavy core of lead to form an anvil supporting the blows of the types and sound-deadening winding of soft rubber on the inner tube affording a yieldable backing for the lead tube; plugs of rubber or other yielding sound-insulating material inserted in the ends of the inner tube for yieldingly supporting the same and the heavy lead tube from the axle of the platen; and hubs or bushings of metal for holding the yielding plugs, and by means of which the platen as a whole may be fixed against movement on its axle.

Other features and advantages will hereinafter appear.

In the accompanying drawings.

Figure 1:
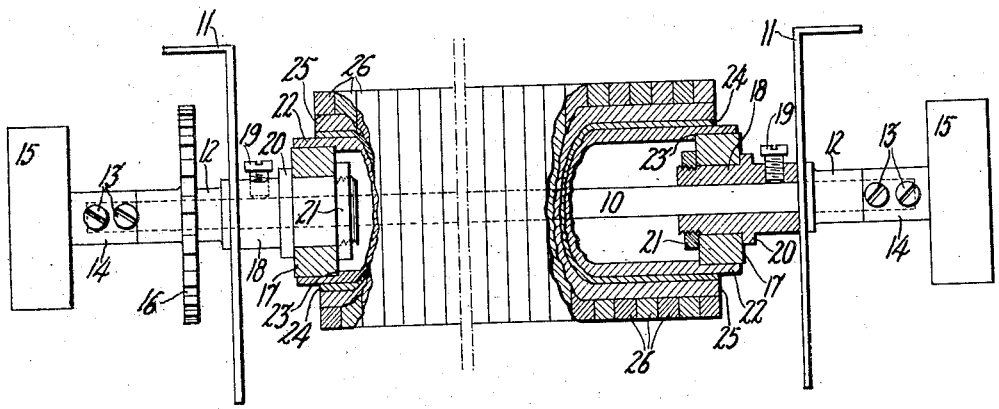
Figure 1 is a view, in front elevation, of a platen journaled in the side plates of a platen-frame; the platen being partly broken away to show its interior structure.

The platen-axle 10 is journaled in the side plates 11 of a platen-frame; bosses 12 being provided on the plates 11 to form extended bearings for the axle 10. Secured by setscrews 13 to the ends of the axle 10 are the hubs or bosses 14 of hand-wheels 15, by means of which the platen may be rotated.
Also secured to the axle at the left-hand side of the frame is a line-space ratchet-wheel 16, operable in any well-known manner by linespace mechanism, not shown.

The cylindrical or body portion of the platen has right and left hand heads, end pieces or collars 17 set upon hubs 18 secured by set-screws 19 to the axle 10. Annular flanges or shoulders 20 formed on the hubs 18 serve as outside abutments for the end pieces or collars 17; and nuts 21 threaded into the opposed ends of the hubs 18 hold the end pieces 17 against the abutments 20. The hubs 18 are preferably of metal, and the collars 17 of some sound-deadening material, such as rubber, to prevent transmission of sound from the cylindrical portion of the platen to the axle and thence to the frame of the machine. As the rubber collars are pressed against the abutments 20 by the nuts 21, they are not only held against longitudinal movement on the hubs 18, but are compressed in such a manner as to bind firmly upon the hubs 18, and thus be held against rotary displacement on the latter. The diameter of the hubs 18 may be greater, and the diameter of the collars 17 less, than shown; the idea being that the hubs 18 and the collars 17 together form the end pieces or supports for the cylinder, and that a portion of these end pieces between the cylinder and the axle is of sound-insulating material.

The cylinder or platen proper is formed in several tubular sections. The inner section is a tube 22, preferably of steel, copper or other relatively strong and stiff material, supported at its ends upon the collars 17. The collars 17 are set tightly into countersinks 23 in the ends of the tube 22. Where the collars 17 are of rubber, rotary slip of the tube 22 thereon is resisted, and this resistance is made assuredly effective by the lateral compression of the collars 17 by the nuts 21.

In the preferred form of the invention, a tube 24 is formed on the outside of the tube 22 by winding on the latter, in superposed layers, under tension, a continuous sheet of soft rubber. Over the tube 24 thus formed is snugly set still another tube 25, which is preferably of lead.

Figure 2:
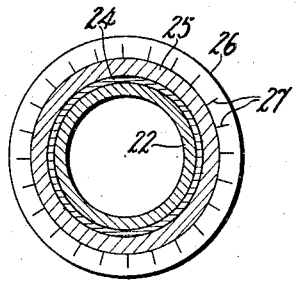
Figure 2 is a view in cross-section on the line 2—2 of Figure 1.

The surfacing sleeve, or the sleeve which is the surface against which the types strike, is formed of a series of rings or annuli 26 set face to face. This sleeve is preferably built or set together in the first instance upon a mandrel. The opposing faces of the rings or annuli are cemented, and thus cemented are forced together under high pressure. The rings themselves are preferably of sufficiently hard rawhide. Originally, or as first put together, they may be of greater outer diameter than the desired diameter of the platen; but, after being set together to form the sleeve, such sleeve may be turned down to the proper size. As shown at 27 (Figure 2), the several rings or annuli, throughout their circumference, and at relatively close intervals, are cut radially outward from their inner periphery. These cuts are for the purpose of giving the outer cylinder, as a whole, a certain resiliency and flexibility. The cuts, however, do not extend so close to the outer periphery of the cylinder as to unduly weaken the latter.

The bulky lead tube contributes an element of weight, and the platen as shown in the drawings is therefore substantially heavier than an ordinary platen. The overweight gives the platen the nature of an anvil, which, by reason of its great inertia, supports or opposes the blows of the types, and thus conduces to efficiency of the type-bars, and favors clearness of type-impressions. The inking ribbon, being pressed between the rapidly thrown type and the heavy inert platen, is found to be affected in such a way that it deposits ample ink upon the work-sheet, even when the touch upon the type-operating keys is light. The clearness, evenness and fullness of the inked type-impressions are due partly to the overweighting of the platen, and partly to the use for this purpose of a substantial lead tube, the heavy lead being a soft metal or impressible to an extent to yield somewhat at the type blows, and tending to bring out clearly and evenly the entire outline of the type upon the work-sheet. The soft, yielding support for the lead tube, which may consist partly of the soft-rubber windings 24 and partly of the soft-rubber bushings or hubs 17, tends to prevent the lead from being battered by the type blows, or prevents excessive resistance by the lead tube to said blows. Besides all this, the lead tube is non-resonant and therefore quiet in operation, and the soft-rubber supports for the lead tube conduce further to diminution of sound.

One feature of the invention pertains to the trouble which in ordinary typewriters arises from the use of thin, light and springy type-bars, most of whose types are much offset, and the use of light, hard, springy platens. The springy type-bar tends to rebound from the ordinary springy platen, and the force of the type blow is dissipated without making a clear impression of the type, and the type-bar also tends to strike the platen a second time and in a slightly different place. The heavy body of lead illustrated herein, on the contrary, tends to cause the desired work to be performed by the momentum of the type-bar, and therefore to overcome the force-dissipating troubles mentioned. The momentum is at once used up, and the type strikes only once, and, by reason of the slight plastic, malleable or impressible nature of the heavy lead, a clear impression is made. Easy and quiet operation and excellence of printing are thus secured.

Owing to the weight of the lead tube, there is a tendency in rapid operation for the platen to overthrow at the line-spacing operation, and by repeated shocks to wear out or injure the line-space stop devices; but this tendency is substantially lessened by reason of the yielding or cushioning nature of the sound-insulating rubber plugs 17, which are included in the platen-driving and arresting train.

The wear-resisting facing 26 prevents the lead from being cut by the sharp types, but is itself flexible and of a somewhat plastic or impressible character, giving the dual result of conducing to clearness of type-impressions on the work-sheet and reducing the sound of the type blows.

Variations may be resorted to within the scope of the invention, and portions of the improvements may be used without others.

Having thus described my invention, I claim:

1. A platen for a typewriting machine, including a tube of lead or equivalent non-resonant material, a jacket or facing of rawhide therefor, and a relatively thin tube of steel or other metal on which the first-named tube is supported.

2. A platen for a typewriting machine, including a tube of lead or equivalent non-resonant material, a jacket or facing of rawhide therefor, a tube of steel or other metal on which the first-named tube is supported, and plugs of rubber or equivalent sound-insulating material inserted in the ends of the last-named tube, whereby to support the platen on its axle.

3. A cylindrical platen for a typewriting machine, including a tube of steel or other metal, plugs of rubber or equivalent sound-insulating material inserted in the ends of the tube, whereby to support the platen on its axle, a winding of soft rubber sheeting upon the tube, a relatively heavy tube of lead on the rubber winding, and a facing jacket of compressed rawhide on the lead tube.

4. A cylindrical platen for a typewriting machine, including a tube of steel or other metal, a winding of soft rubber sheeting upon the tube, a relatively heavy tube of lead on the rubber winding, and a facing jacket of compressed rawhide on the lead tube.

5. A platen for a typewriting machine, including a core, and a jacket or facing therefor, consisting of rings or annuli of rawhide, set face to face laterally of one another along the core, and interiorly scored to render the rawhide jacket yielding and resilient on the core.

6. A platen for a typewriting machine, including a solid wall tube of lead, and a jacket or facing therefor, consisting of rings or annuli of compressed rawhide fixed to one another face to face along the tube and of a thickness to maintain the tubular shape of the jacket.

7. A platen for a typewriting machine, including a weight in the form of a heavy solid-wall tubular leaden core forming an anvil, and a facing jacket therefor of relatively hard resilient material.

8. A cylindrical typewriter platen including a heavy leaden tubular solid wall body forming an anvil, a yielding support whereby said body is mounted for rotation, and a wear-resisting facing for said body.

9. A cylindrical typewriter platen including a heavy leaden tubular solid wall body forming an anvil, a wear-resisting facing therefor, an axle for said platen, and yielding rubber heads supporting said body on said axle.

10. A cylindrical typewriter platen body including an interior stiff tube, soft rubber surrounding said tube, a substantial tube of lead forming an anvil upon said soft rubber, a wear-resisting facing, and yielding rubber supports for said body.

11. A cylindrical typewriter platen bed or body, one portion of which is a heavy lead tube forming an anvil, and another portion of which is soft rubber in tubular form and extending along said lead tube, and co-operative therewith to support the type-blows, and a wear-resisting sheath or outer facing.

12. A cylindrical typewriter platen comprising an overweighted metal tubular body, means for cushioning said body upon the platen axle, and a flexible durable covering for said body to protect the same from indentation by the types, and to co-operate with said body to produce clear type-impressions upon the work-sheet.

BURNHAM C. STICKNEY.